(12) United States Patent
Baker

(10) Patent No.: US 7,988,239 B1
(45) Date of Patent: Aug. 2, 2011

(54) BEARING MOUNT FOR WHEEL MOUNTED DECORATIVE MEMBER

(76) Inventor: Scott Baker, Sherman Oaks, CA (US)

( * ) Notice: Subject to any disclaimer, the term of this patent is extended or adjusted under 35 U.S.C. 154(b) by 0 days.

(21) Appl. No.: 10/939,151

(22) Filed: Sep. 13, 2004

(51) Int. Cl.
*B60B 7/04* (2006.01)
(52) U.S. Cl. .................... 301/37.25; 301/37.371
(58) Field of Classification Search ............. 301/37.25, 301/37.101, 37.26, 37.102, 37.34, 37.371, 301/37.106–37.109, 37.38, 37.372, 37.376, 301/108.1–108.5, 109–110, 105.1
See application file for complete search history.

(56) References Cited

U.S. PATENT DOCUMENTS

| | | | | |
|---|---|---|---|---|
| 1,979,895 A * | 11/1934 | Maker | ........................ | 301/37.38 |
| 2,532,605 A * | 12/1950 | Castleberry | ........................ | 301/1 |
| 2,794,875 A * | 6/1957 | Trinca | ........................ | 200/61.25 |
| 3,092,420 A * | 6/1963 | Baldwin et al. | ........................ | 301/37.38 |
| 3,722,958 A * | 3/1973 | Marshall | ........................ | 301/37.25 |
| 4,986,608 A * | 1/1991 | Fett | ........................ | 301/124.1 |
| 5,190,354 A * | 3/1993 | Levy et al. | ........................ | 301/37.25 |
| 5,190,355 A * | 3/1993 | Hobbie et al. | ........................ | 301/105.1 |
| 5,538,330 A * | 7/1996 | Ehrlich | ........................ | 301/124.1 |
| 5,845,972 A * | 12/1998 | Baker | ........................ | 301/37.38 |
| 6,048,036 A * | 4/2000 | Alaoui | ........................ | 301/37.376 |
| 6,102,489 A * | 8/2000 | Boese et al. | ........................ | 301/137 |
| 6,517,167 B2 * | 2/2003 | Baker | ........................ | 301/37.25 |
| 6,663,187 B2 * | 12/2003 | Fitzgerald | ........................ | 301/37.25 |
| 6,702,395 B1 * | 3/2004 | Wang | ........................ | 301/37.25 |
| 6,715,843 B2 * | 4/2004 | Teague | ........................ | 301/35.621 |
| D500,719 S * | 1/2005 | Baker | ........................ | D12/207 |
| D500,976 S * | 1/2005 | Baker | ........................ | D12/207 |
| 6,896,334 B1 * | 5/2005 | Baker | ........................ | 301/37.25 |
| 7,014,273 B1 * | 3/2006 | Yang et al. | ........................ | 301/37.25 |
| 7,093,909 B1 * | 8/2006 | Korpi et al. | ........................ | 301/37.25 |
| 2005/0093362 A1 * | 5/2005 | Alicea | ........................ | 301/37.25 |

* cited by examiner

*Primary Examiner* — Jason R. Bellinger
(74) *Attorney, Agent, or Firm* — Colin P. Abrahams

(57) ABSTRACT

A wheel assembly includes a decorative member mounted on an outer race of a bearing carried in a holder with an inner race mounted on a spindle and secured by an attachment fastener. The bearing holder is carried on the spindle projecting from a coupler hub fixed to an axle cap secured to a vehicle axle hub. Set screw fasteners are employed to retain securement fasteners to the spindle and to retain the coupler hub fasteners with the axle cap. The wheel mounting assembly permits the movably mounted decorative member carried on the rotatable vehicle axle hub to remain static or to rotate while the wheel is turning as a vehicle travels along a roadway.

9 Claims, 4 Drawing Sheets

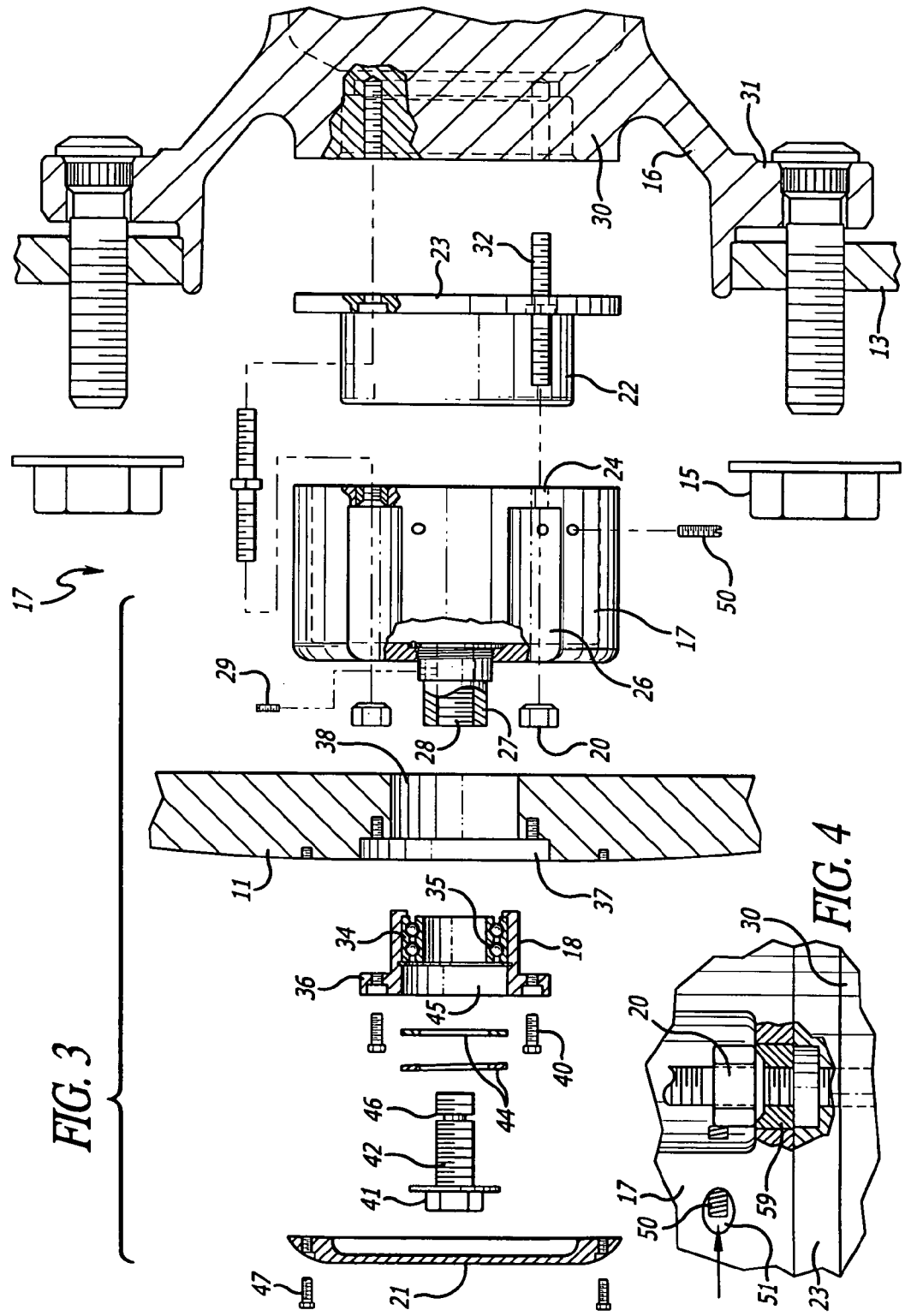

BEARING MOUNT FOR WHEEL MOUNTED DECORATIVE MEMBER

BACKGROUND OF THE INVENTION

1. Field of the Invention

The present invention relates to the field of automotive accessories, and more particularly to a novel wheel assembly that employs interchangeable decorative members which rotate with or remain or appear static as the wheel rotates.

2. Brief Description of the Prior Art

In the past, the conventional aluminum wheel design has employed elaborate "center" decorations and designs which require removal of substantial material from the wheel itself in order to create the design. The most limiting factor to the creative expression or enhancement of the "center" of the wheel is the direct effect material removal has on the strength of the wheel to create the design. Therefore, problems and difficulties have been encountered with employing conventional wheel design, which stem largely from the fact that the design enhancement is greatly limited due to the required removal of wheel material which then greatly weakens the strength of the wheel. Also, wheel center design is generally unchangeable and requires the placement of new wheels with different designs to achieve design change.

Furthermore, some prior centers for wheel visual enhancement are integral, non-removable members requiring structures fixedly secured to the wheel so as to rotate with the wheel as the vehicle mounting the wheels moves along a roadway. Thus, the variety of design and decorative options are greatly limited. For example, any design center enhanced by static viewing cannot be read or understood as a wheel rotates since such indicia becomes blurred. Decorative members or covers mounted on a wheel are disclosed in U.S. Letters Patents 5,845,972 and 6,517,167.

Therefore, a long-standing need has existed to provide a novel wheel design member or decorative member arrangement which includes a coupler that permits a variety of design configurations to be placed in the central area of the wheel and which may rotate with or appear to be or is stationary while the wheel rotates. Strength of the wheel will not be adversely affected and interchange ability of different designs should be accommodated.

SUMMARY OF THE INVENTION

Accordingly, the above problems and difficulties are avoided by the present invention which provides a wheel assembly that includes a decorative member incorporating a given design and which is not a load-bearing member and, therefore, creative expression is unlimited. In one form, the decorative member is mounted on the outer race of a bearing carried in a holder with an inner race mounted on a spindle and secured by an attachment means. The bearing holder is carried on the spindle projecting from a coupler hub fixed to an axle cap secured to a vehicle axle hub. Set screw fasteners are employed to retain securement fasteners to the spindle and to retain the coupler hub fasteners with the axle cap.

Furthermore, since the front and rear wheels are mounted on different axles, the coupler hub is configured so as to be acceptable for installation for either axle. The decorative member may rotate with the wheel in a static position since it is secured to the vehicle axle.

The inventive concept incorporates a wheel installation or mounting assembly permitting a movably mounted decorative member on a rotatable vehicle axle hub to remain static or to rotate while the wheel is turning as a vehicle travels along a roadway.

Therefore, it is among the primary objects of the present invention to provide a novel wheel assembly having at least one decorative member having a design area which is not subjected to loads and stresses normally encountered during road conditions.

Another object of the present invention is to provide a novel decorative member and mounting assembly which can be attached to a conventional wheel and which allows the wheel to rotate while the decorative member remains in either a static or stationary position or rotates when the wheel is static.

Yet another object of the present invention is to provide a novel decorative wheel member mounting assembly which will permit quick interchangeability of the member.

Still a further object of the present invention is to provide a novel wheel which has a mounting for a decorative member permitting interchangeability of and which provides for the decorative member to be static while the wheel turns or permits the decorative member to rotate while the wheel rotates or remains stationary.

A further object resides in providing a wheel having a mounting assembly for a decorative member, wherein one member in one structure permits the member to rotate with the wheel while another member in another structure permits the member to remain in a static or stationary orientation as the wheel turns.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

FIG. 3 is an exploded sectional view illustrating all of the components in the bearing mount assembly for wheel mounted decorative members, as taken in the direction of arrows 3-3 of FIG. 1;

FIG. 4 is a fragmentary sectional view of a nut set screw holding construction used in the assembly shown in FIG. 3;

DESCRIPTION OF THE PREFERRED EMBODIMENT

Figure 1:
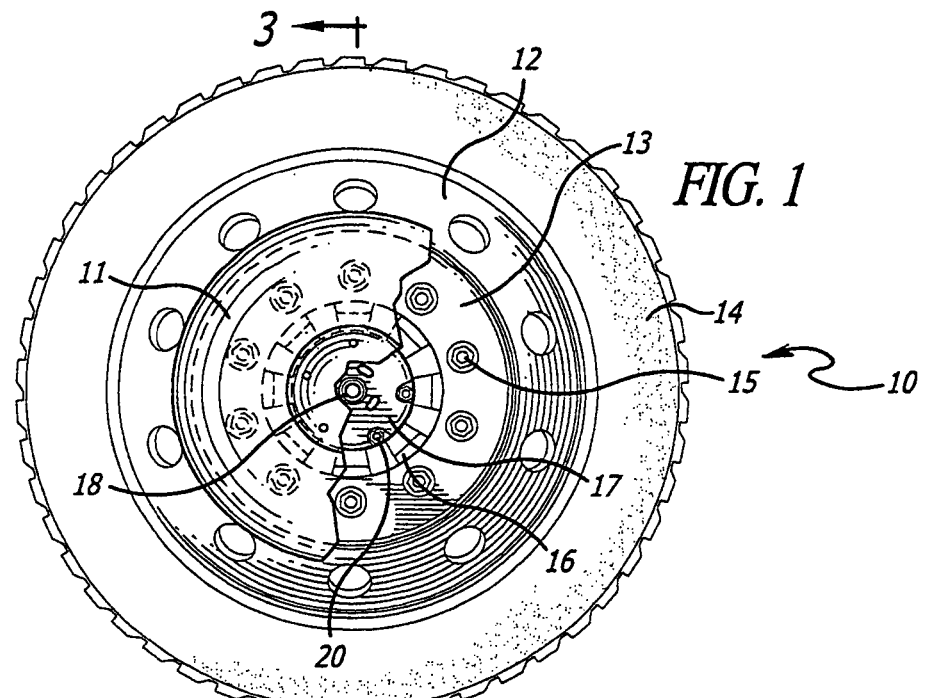
FIG. 1 is a front elevational view of a vehicle wheel incorporating the present invention including a bearing mount assembly for a wheel mounted decorative member.
Figure 2:
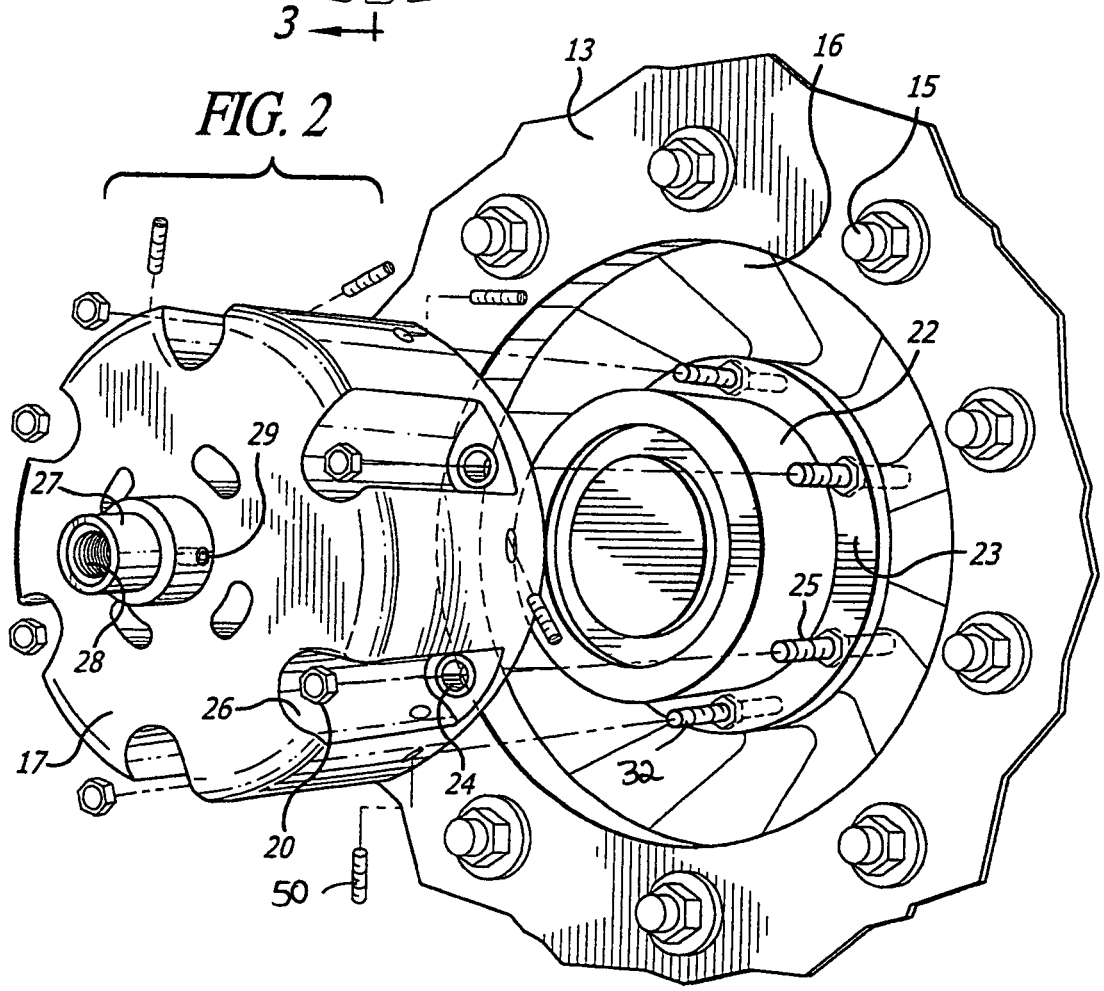
FIG. 2 is an exploded perspective view of the major components comprising the bearing mount assembly shown in FIG. 1.

Referring to FIGS. 1 and 2, the novel bearing mount assembly for a wheel mounted decorative member is illustrated in the general direction of arrow 10 and includes a decorative member 11 which, in the present embodiment, will remain in a spinning or rotating condition when the wheel rim 12 is at rest. A rim flange 13 is carried on the rim 12 and is secured to the vehicle axle hub by a plurality of bolts and nuts, such as indicated by numeral 15. A tire 14 is carried on the wheel rim 12 and the vehicle axle hub (not shown) is connected to the rim flange 13 by a web 16. A coupler hub 17 carries a bearing holder 18 on which the decorative member 11 is mounted. A plurality of bolt and nut fasteners 20 secure the coupler hub to an axle cap 22 that is attached to the vehicle axle hub. A cover 21 finishes the end of the assembly and is attached to the decorative member.

Referring now in detail to FIG. 2, it can be seen that the coupler hub 17 is secured to an axle cap 22 by means of bolt and nut fasteners 20. Also, it can be seen that the bolt of the fastener arrangement 20 projects into the vehicle axle hub underneath a plate 23 which is integrally formed with the axle cap 22. It is to be particularly noted that the coupler hub 17 includes a plurality of holes, such as hole 24, which accepts and passes the bolt, such as bolt 25, carried on the plate 23. The nut is then run on the bolt to secure the hub in position on the axle cap. The holes 24 are at the end of an open channel 26 in the peripheral edge marginal region of the coupler hub.

Also, it is to be noted that the coupler hub 17 includes an outwardly projecting spindle 27 which includes a bore having internal threads 28 and a set screw 29. The outer surface of spindle 27 receives the inner race of a bearing in holder 18 when assembled.

Referring now to FIG. 3, it can be seen that the vehicle axle hub is identified by numeral 30 and that the web 16 outwardly radiates therefrom to terminate in a peripheral portion 31 that is attached to the rim 13 by nut and bolt fasteners 15. The axle cap 22 is secured to the vehicle axle hub by a plurality of bolts, such as bolt 32, that is recessed into the axle hub 30. The bolt 25 also outwardly projects from the opposite side of plate 23 in order to receive the nut for the fastener 20 after the bolt has passed through the opening 24 in the coupler hub 17.

Also, it can be seen that the opposite side of the coupler hub 17 mounts the outwardly projecting spindle 27 on which the bearing holder 18 is supported. The bearing holder supports a bearing having outer race 34 and an inner race 35 which is supported on the spindle 27. Since the decorative member 11 is carried on the bearing holder 18, the decorative member can rotate as the outer bearing 34 rotatably supports the decorative member. The bearing holder 18 is supported in the decorative member 11 by means of a flange 36 that fits into recess 37 in the decorative member so that the major length of the bearing holder passes through opening 38 in the center of the decorative member whereby the inner race 35 slips over the spindle 27. The bearing holder 18 is retained on the decorative member 11 by means of screws, such as screw 40. A securement fastener 41 includes a threaded shaft 42 that passes through the center of the bearing for threadable engagement with the threaded bore 28 on spindle 27. Washers 44 are inserted into recess 45 so that the securement fastener 41 is seated properly. The threaded shaft 42 includes a circular slot 46 receiving set screw 29 in order to complete retention of the bearing assembly. Cover 21 is fastened to the decorative member by screws 47.

Referring now in detail to FIG. 4, it can be seen that the nut of the nut and bolt fastener 20 is retained in position on the bolt by a set screw 50 which is introduced through a threaded bore provided in a channel 51 in the coupler hub 17. A stainless steel sleeve 59 is located in the bore for receiving the bolt of combination 20 which resists wear and is useful in transferring loads.

Figure 5:
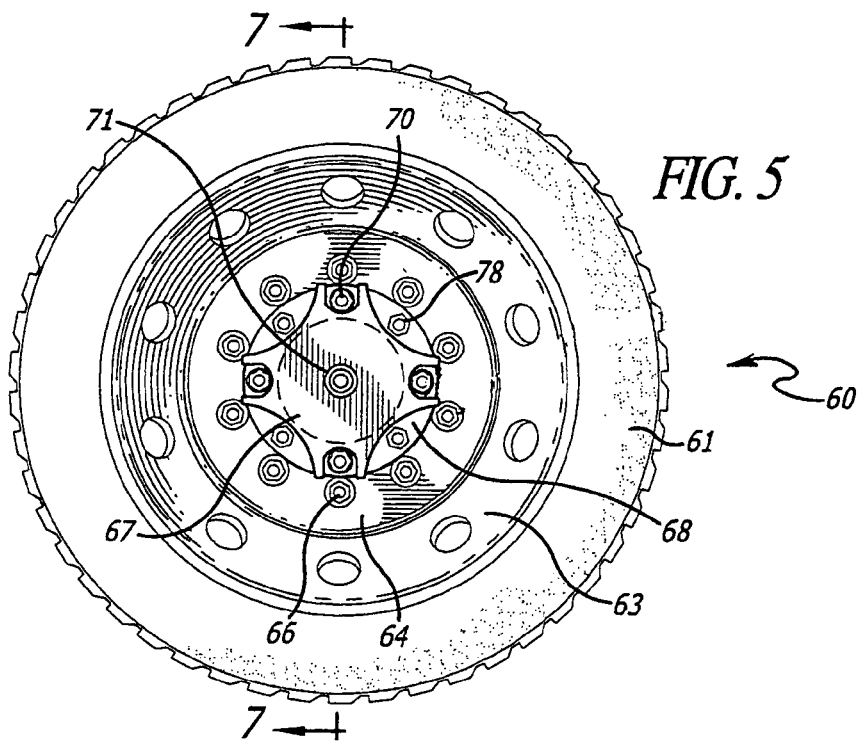
FIG. 5 is a front elevational view of another embodiment of the present invention.
Figure 6:
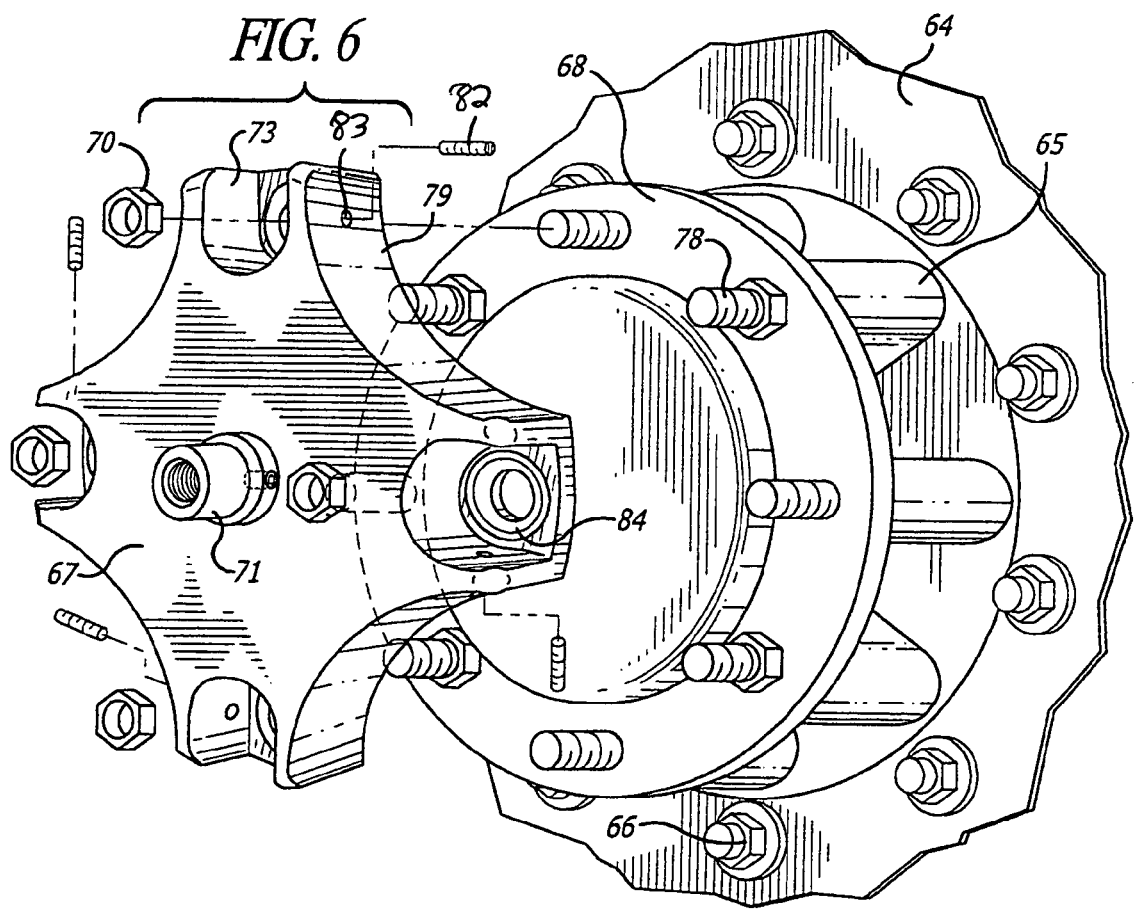
FIG. 6 is an exploded perspective view illustrating major components of the mounting assembly employed in the embodiment shown in FIG. 5.

Referring now to FIGS. 5-8, another embodiment of the present invention is illustrated in the general direction of arrow 60. In FIGS. 5 and 6, it can be seen that a tire 61 is carried on the periphery of a rim 63 having a flange 64 that is secured to an axle hub 65 by means of a plurality of nut and bolt arrangements 66. A coupler hub 67 is similar to the hub 17 shown in FIGS. 1-4 inclusive and is mounted on an axle cap 68 by means of bolt and nut fasteners 70. The coupler hub 67 includes an outwardly projecting spindle 71, as shown more clearly in FIG. 6, and spindle 71 is identical to spindle 27 shown with respect to hub 17. The spindle includes an internal threaded bore into which a threaded shaft on a securement fastener 72 is coupled and the securement fastener 72 is shown more clearly in FIG. 7. The edge marginal region of the coupler hub 67 includes a plurality of cut-outs, such as cut-out 79 in FIG. 6, in order to permit the presence of a bolt for accepting a nut with respect to a bolt and nut fastener 78. The coupler hub further includes a deep recess 73 for receiving other fasteners, such as bolt and nut fastener 70.

Figures 7, 8:
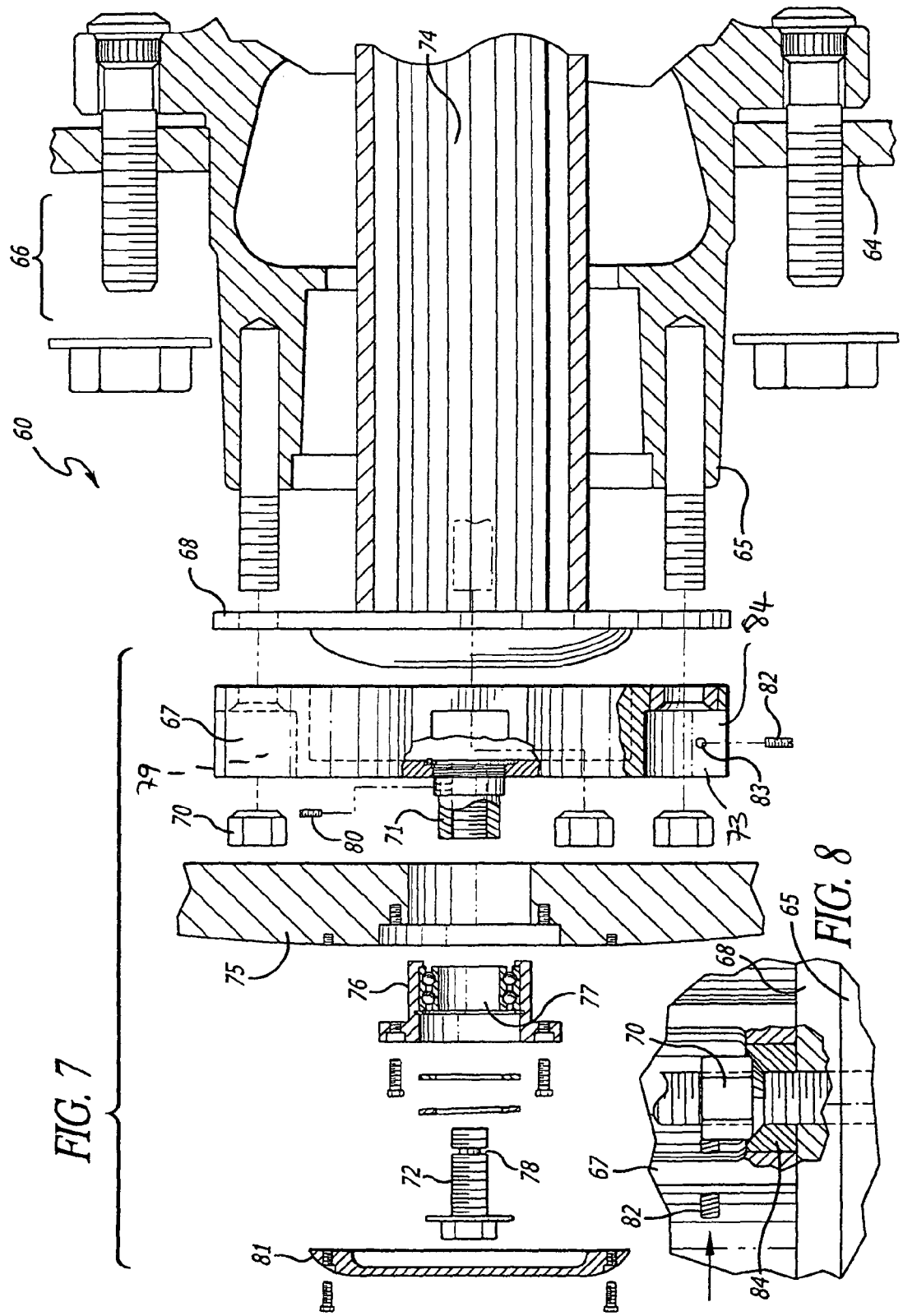
FIG. 7 is an exploded sectional view taken in the direction of arrows 7-7 of FIG. 5.
FIG. 8 is a fragmentary sectional view of a set screw construction for retaining nut on bolt in the assembly shown in FIG. 7.

Referring now in detail to FIG. 7, it can be seen that the axle cap 68 is carried on the end of an axle 74 and that the nut and bolt fastener plurality, represented by numeral 70, passes through a flange on the axle cap in order to connect and secure with the coupler hub 67. The web 64 of the wheel rim is connected to the axle hub 65 by the nut and bolt arrangement 66. It is noted that the decorative member 75 is rotatably supported on bearing holder 76 so that the inner race 77 of the bearing rests on the spindle 71. The securement fastener 72 is received on the threaded bore of spindle 71 and the threaded shaft includes a slot 78 for receiving set screw 80 to complete securement.

As used in the embodiment identified by numeral 60, a cover 81 is fastened to the decorative member 75.

Referring now in detail to FIG. 8, it can be seen that the nut of the nut and bolt combination 66 is maintained in a locked position by means of a set screw 82 which passes through hole 83 in one of the legs of the adapter coupler hub. The set screw bears against the nut of the nut and bolt combination 66 so that it will not loosen and is locked in position. Also, FIG. 8 illustrates that a stainless steel sleeve 84 is located in the bore for receiving the bolt of the bolt and nut combination 66 which resists wear and is useful in transferring loads.

In view of the foregoing, it can be seen that the decorative member 75 is free to rotate on its bearing mounting carried on the adapter coupler hub or if it is desired that the decorative member be stationary as the wheel turns, a weight may be attached to the decorative member so that it resists the tendency to rotate. Rotation of the decorative member usually appears after the wheel has stopped, such as when the vehicle is at a stop signal so that the decorative member will continue rotating. On the other hand, when the vehicle, and therefore the wheels have stopped rotating, and an eccentric decorative member 75 is employed, the decorative member will remain static. It is also to be understood that graphic representations, pictorial subject matter or any alpha/numeric information may be carried on the external surface of the decorative member or may be built into the construction, per se.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A wheel mounted decorative assembly comprising:

an axle hub rotatably mounted at an end of a rear wheel axle housing, the axle hub having a first attachment means for releasably attaching thereto a wheel and a separate second attachment means;

a single piece coupler hub for mounting to the second attachment means of the axle hub, the coupler hub having a threaded spindle thereon;

a decorative member having a stepped central opening therethrough and mounted on the coupler hub, the coupler hub being disposed between said axle hub and said decorative member so as to permit independent rotation of said decorative member with respect to said axle hub;

a bearing which is fully housed in the stepped central opening of the decorative member and located between said decorative member and said coupler hub and having an inner race mounted on the threaded spindle of said coupler hub and an outer race retained on said decorative member, the bearing having a central aperture extending therethrough;

a bolt for fastening the bearing and decorative member to the threaded spindle of the coupler hub, the bolt passing through the central aperture of the bearing and engaging the threaded spindle on the coupler hub; and a set screw for securing the bolt in the spindle of the coupler hub.

2. The assembly defined in claim 1 including:
a holder secured to said decorative member and mounting said bearing onto said decorative member.

3. The assembly defined in claim 2 including:
a securement fastener releasably connecting said decorative member to said coupler hub.

4. The assembly defined in claim 3 including:
fastener means securing said coupler hub with said axle hub.

5. The assembly defined in claim 4 wherein:
said fastener means includes bolt and nut arrangements encircling said coupler hub; and
said coupler hub having a plurality of open channels along a peripheral edge marginal region of said coupler hub for accommodating said bolt and nut arrangements.

6. The assembly defined in claim 5 including:
a set screw threadably carried on said coupler hub engageable with said bolt and nut arrangement to releasably retain a nut of said arrangement in a locked position.

7. The assembly defined in claim 6 including:
a stainless steel sleeve included in each bolt and nut arrangement and carried in each channel of said coupler hub.

8. The assembly defined in claim 7 wherein:
said coupler hub is star-shaped.

9. The assembly defined in claim 8 wherein:
said coupler hub is cylindrical shaped having said channels opening laterally and at a selected end thereof.

\* \* \* \* \*